(12) United States Patent
Kuitunen

(10) Patent No.: US 12,472,504 B2
(45) Date of Patent: Nov. 18, 2025

(54) HOLDER, A SET OF PARTS, AND A METHOD OF MANIPULATING HOLDERS OF LABORATORY CONSUMABLES

(71) Applicant: Sartorius Biohit Liquid Handling Oy, Helsinki (FI)

(72) Inventor: Tuomas Kuitunen, Helsinki (FI)

(73) Assignee: Sartorius Liquid Handling oy, Helsinki (FI)

( * ) Notice: Subject to any disclaimer, the term of this patent is extended or adjusted under 35 U.S.C. 154(b) by 351 days.

(21) Appl. No.: 17/406,139

(22) Filed: Aug. 19, 2021

(65) Prior Publication Data

US 2022/0062912 A1 Mar. 3, 2022

(30) Foreign Application Priority Data

Aug. 26, 2020 (EP) .................................... 20397510

(51) Int. Cl.
 *B01L 9/00* (2006.01)
 *G01N 35/00* (2006.01)
(52) U.S. Cl.
 CPC .......... *B01L 9/543* (2013.01); *G01N 35/0099* (2013.01); *B01L 2300/041* (2013.01); *G01N 2035/00306* (2013.01)
(58) Field of Classification Search
 None
 See application file for complete search history.

(56) References Cited

U.S. PATENT DOCUMENTS

| 5,366,088 A | 11/1994 | Hill et al. | |
| 6,534,015 B1* | 3/2003 | Viot | B01L 9/543 |
| | | | 206/506 |
| 2006/0045815 A1 | 3/2006 | Hovatter | |
| 2009/0293643 A1* | 12/2009 | Powell | B01L 9/543 |
| | | | 206/505 |
| 2018/0221884 A1* | 8/2018 | Mendez | B01L 9/543 |
| 2019/0201908 A1 | 7/2019 | Gomes | |

FOREIGN PATENT DOCUMENTS

| CN | 109070085 A | 12/2018 |
| CN | 210159633 U | 3/2020 |
| JP | S6133934 A | 2/1966 |
| JP | S3034455 A | 4/1991 |
| JP | H06255654 A | 9/1994 |
| JP | 2014077757 A | 5/2014 |
| JP | 2014517741 A | 7/2014 |
| JP | 2019516544 A | 6/2019 |
| RU | 2270721 C2 | 2/2006 |

* cited by examiner

*Primary Examiner* — Paul S Hyun
(74) *Attorney, Agent, or Firm* — Laine IP Oy

(57) ABSTRACT

According to an example aspect of the present invention, there is provided a holder for disposable pipette tips, the holder comprising: two pairs of opposing lateral sidewalls, each sidewall comprises an outer surface, an inner surface, an upper edge and a lower edge, and two lateral edges; the sidewalls are joined to each other via their lateral edges; a plate comprising a matrix of openings, connected to the upper edges of the sidewalls; wherein the holder may be locked on top of another holder to form a stack of holders; wherein the locking is configured to be released by applying a force to a locking element from above the stack of holders.

16 Claims, 20 Drawing Sheets

HOLDER, A SET OF PARTS, AND A METHOD OF MANIPULATING HOLDERS OF LABORATORY CONSUMABLES

FIELD

The present invention relates to racks for disposable pipette tips, and more particularly to assembling and using tip racks in a stack form.

BACKGROUND

Pipette tips are often sold in stacks of several tip racks. Each rack contains a matrix of holes for holding tips individually in a vertical position. Advantages of such stacks with regard to individual racks include space savings, reduced storage and transport costs and sustainability due to use of less packaging material.

In liquid handling robots, racks are freely detachable from a stack in order to facilitate their use. Typically the topmost rack is removed and transferred for use by the liquid handling robot.

Such stacks must be handled carefully to avoid uncontrolled collapse of the stack and falling of the tips on a table or floor. This applies particularly to situations in which a user manually moves the stack or manually removes the topmost rack from the stack and places it to a platform of a liquid handling robot.

It is known to provide locking mechanisms in which a squeezing action or a horizontally oriented force is needed to release the locking.

US 2006045815 A1 discloses a pipette tip grid with lock mechanism. A pipette tip grid with holes for holding pipette tips and packages for the grids are provided. A pipette tip grid package comprises a grid, a base for supporting the grid, and a lock mechanism coupled to the grid and configured to externally engage with a sidewall of the base.

There is a need for an improved locking and releasing mechanism for stacked tip racks to facilitate their automated handling in liquid handling robots.

There is a need for a compact locking and releasing method for stacked tip racks.

The present invention is aimed at overcoming at least a part of the disadvantages of the known tip racks and their stacks.

SUMMARY OF THE INVENTION

The invention is defined by the features of the independent claims. Some specific embodiments are defined in the dependent claims.

According to a first aspect of the present invention, there is provided a holder for laboratory consumables, the holder comprising: two pairs of opposing lateral sidewalls; each sidewall comprises an outer surface, an inner surface, an upper edge and a lower edge, and two lateral edges; the sidewalls are joined to each other via their lateral edges; a plate comprising a matrix of openings, connected to the upper edges of the sidewalls; means for locking it on top of another holder to form a stack of holders; wherein the locking is configured to be released by applying a force to said means for locking from above the stack of holders.

Various embodiments of the first aspect may comprise at least one feature from the following bulleted list:
  Said applying of a force comprises applying a vertically-directed input force from above the stack of holder.
  The holder comprises at least one release opening into which a release device can be inserted from above the stack of holders in order to release the locking.
  Said at least one release opening is located in a surface that is parallel with said plate comprising a matrix of openings.
  Said at least one release opening is located in the plate comprising a matrix of openings.
  The releasing of the locking only releases the topmost holder from the remaining holders of the stack.
  The means for locking comprises at least one flexible or deformable tongue.
  The means for locking comprises a radially deformable hollow pin.
  The means for locking is detachable from and re-attachable to the holder.

According to a second aspect of the present invention, there is provided a set of parts comprising at least a first holder and a second holder for disposable pipette tips according to the first aspect.

Various embodiments of the second aspect may comprise at least one feature from the following bulleted list:
  The holders are locked to each other, the first holder on top of the second holder, and form a stack.
  The set of parts further comprises a release device configured to be inserted into the release opening or openings of the topmost holder of the stack from above the stack of holders in order to release the locking between the topmost holder and the holder lying immediately below it.
  The release device is in the form of a pin, a bar or a handle.
  An end of said release device is configured to be inserted into a release opening of the topmost holder.
  The release device is configured to be operated by an automated liquid handling robot.

According to a third aspect of the present invention, there is provided a method of manipulating holders of laboratory consumables, the method comprising: providing a locked stack of holders; releasing the locking between the uppermost holder and the holder lying immediately below it by applying a force to the means for locking in the uppermost holder from above the stack of holders; removing the uppermost holder from the stack of holders.

Various embodiments of the third aspect may comprise at least one feature from the following bulleted list:
  Said releasing comprises applying a vertically-directed input force from above the stack of holders.
  Said vertically-directed input force is applied by a user.
  Said vertically-directed input force is applied by an automated device.
  Said providing step comprises providing a locked stack of holders according to the first aspect to a platform of an automated device, such as an automated liquid handling robot.
  Said force is applied by the automated device.
  In said releasing step, said automated device inserts a release device into a release opening of the uppermost holder from above the stack of holders, whereby the locking between the uppermost holder and the holder lying immediately below it is released.
  The uppermost rack becomes connected to the release device upon said releasing of the locking.
  Said removing comprises lifting the uppermost holder from the stack together with and as connected to the release device.

According to a fourth aspect of the present invention, there is provided a means for locking a first holder of laboratory consumables on top of a second holder of laboratory consumables to form a locked stack of holders, wherein each holder comprises: two pairs of opposing lateral sidewalls; each sidewall comprises an outer surface, an inner surface, an upper edge and a lower edge, and two lateral edges; the sidewalls are joined to each other via their lateral edges; a plate comprising a matrix of openings, connected to the upper edges of the sidewalls; wherein the means for locking is attachable under the first holder, to be encased by the lateral sidewalls and the matrix plate of the first holder; the means for locking comprises a bendable or deformable part that is configured to engage with the second holder in the locked position of the holders; the locking is configured to be released by applying a force to said bendable or deformable part from above the stack of holders.

Various embodiments of the fourth aspect may comprise at least one feature from the following bulleted list:

Said applying of a force comprises applying a vertically-directed input force from above the stack of holders.

Advantages of the Invention

The present invention facilitates handling of tip holders and their stacks in the context of both automated and manual liquid handling methods.

According to the present invention, the releasing action relies on a force applied in a vertical direction from above the stack, and preferably there is no need to manipulate the stack from its sides in order to release the uppermost holder.

In the present invention, there may be no need to add any components or shapes that would protrude from the lateral sidewalls of the holders.

The present invention provides a space-saving solution to lock holders to each other, which is particularly advantageous in automated liquid handling environments.

EMBODIMENTS

Figure 1:
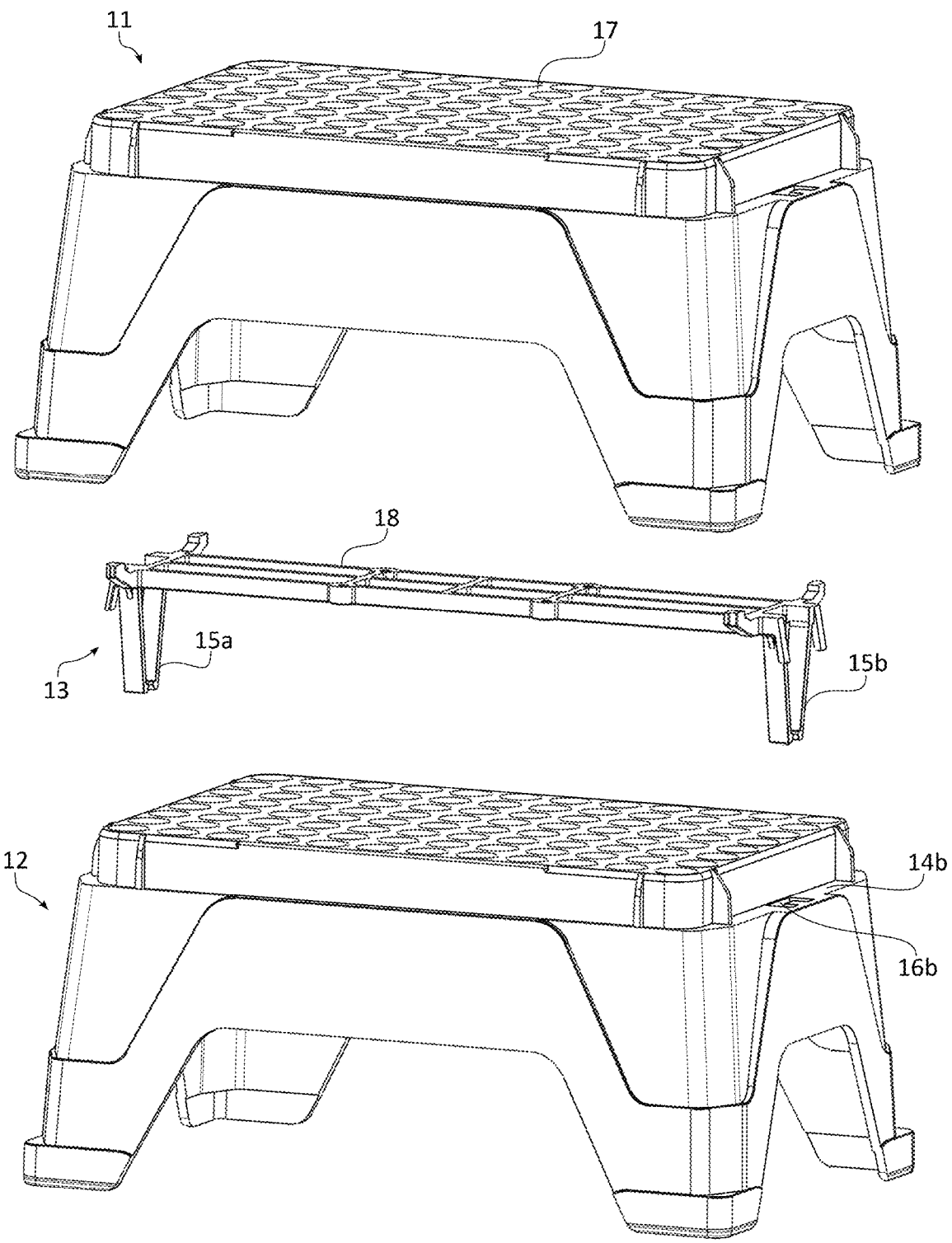
FIG. 1 illustrates two pipette tip racks and a locking device configured to be attached under the rack, in accordance with a first embodiment of the present invention.

As used herein, the terms "approximately" and "about" refer to a value which is ±5% of the stated value.

The present invention provides an improved method for handling pipette tip holders, such as tip racks, which are stored in stack form. The present invention further provides a holder that can be locked on top of another holder to form a stack and then easily released from the stack.

In a preferred embodiment of the present invention, the unlocking or releasing action involves application of force from above the stack. Said force is typically an initial input force applied in a vertical direction.

As used herein, the term "vertical direction" refers to the direction that is orthogonal to the matrix plate of the pipette tip holder.

Holders

The present invention is applicable to holders for storing disposable laboratory consumables, such as holders for disposable pipette tips. Such holders are often stored in nested stacks.

In one embodiment, the holder for disposable pipette tips comprises two pairs of opposing lateral sidewalls, and each sidewall comprises an outer surface, an inner surface, an upper edge and a lower edge, and two lateral edges. The sidewalls are joined to each other via their lateral edges. The holder comprises a plate exhibiting a matrix of openings for tips and connected to the upper edges of the sidewalls. The holder further comprises means for locking the holder on top of another holder to form a stack of holders. The locking is configured to be released by applying a force to said means for locking from above the stack of holders.

Means for Locking

In some embodiments, the means for locking a first tip holder on top of a second tip holder comprises a flexible tongue connected to the first tip holder and configured to co-operate or engage with the second tip holder, for example to be inserted into an opening in the second holder.

In one embodiment, the means for locking comprises one or more flexible tongues connected to the first tip holder and extending below the matrix plate of the first tip holder and configured to be inserted into one or more openings in a second tip holder to lock the holders to each other.

In one embodiment, the distal end or ends of said flexible tongue or tongues or the entire tongues are configured to be bent by means of a release device to release the locking between the holders.

In some embodiments, the means for locking is an integral part of the holder. In other embodiments, the means for locking is a separate part that can be attached to the holder and also detached from it.

For example, the means for locking may comprise one or more bendable tongues that have been fixed to a lower surface of the matrix plate and configured to be inserted into one or more openings in a lower lying holder, respectively, to lock the holders to each other.

Release Opening(s)

In some embodiments, the holder comprises at least one release opening into which, when the holder is the uppermost holder, a release device can be inserted from above the stack of holders in order to release the locking between the two uppermost holders.

In one embodiment, the release opening is located in an upper surface of the holder, for example in the plate comprising a matrix of openings for receiving tips or in a ridge or surface connected to the plate and parallel with it.

There can be any number of release openings, for example 1, 2, 3 or 4 release openings, preferably at least two release openings.

Preferably the release opening or openings are positioned so that they can be accessed and/or manipulated from above, for example by inserting a release device.

In some embodiments, the holder comprises two release openings which are located in the plate comprising a matrix of openings, on opposite sides of the matrix.

In one embodiment, the release opening or release openings may be located outside the rectangular layout of the openings that are to receive and hold tips.

In some embodiments, at least one release opening is located within the matrix, for example at the centre of the matrix plate.

In some embodiments, at least one matrix opening functions as a release opening.

In one embodiment, the release opening in a particular holder may first act as an opening that receives the means for locking, such as a tongue connected to an upper holder to lock these holders to each other. Later, after removal of the upper holder, when said particular holder has become the uppermost holder, the same release opening may act as an opening receiving a release device in order to release said particular holder from the stack.

Release Device and Its Action

In some embodiments, the release device comprises a pin configured to be inserted into a release opening. In case there are several release openings in the same holder, the release device preferably comprises the same number of pins adapted to be inserted into the respective release openings simultaneously to release the locking.

In some embodiments, at least a part of the release device is configured to be inserted into the release opening and to extend below the plane of the plate comprising a matrix of openings.

For example, in order to release the locking, a pin is inserted into a release opening so that at least a distal end of the pin penetrates in a vertical direction through the opening to extend past the plane comprising the matrix plate.

In preferred embodiments, the direction of the releasing force is approximately parallel with the vertical axis of the stack.

In some embodiments, the direction of the force, typically the input force, applied during the releasing action deviates at most by about 20°, preferably at most by about 5°, from the direction of the vertical axis of the stack.

In preferred embodiments, the direction of the input force is approximately vertical.

The vertically-directed input force is typically the initial input force imposed on the holder or a part of the holder, such as on the release device or on the means for locking, to release the locking.

In some embodiments, the imposing of a vertically-directed input force may result, in addition to a releasing output force, in a gripping output force, such as a horizontally-directed gripping output force. The gripping output force may enable lifting of the released holder or holders from the stack.

The gripping output force is typically the force that becomes imposed on the holder or a part of the holder to grip the holder for example for the purpose of lifting the holder.

In the present invention it is preferred to not use any horizontally directed input force for the purpose of releasing the locking between any of the holders or for the purpose of gripping any of the holders for lifting them.

Preferably, the releasing action only releases the uppermost holder from the rest of the stack. In this way a single holder, the uppermost holder, can be picked at a time and transferred for use, while the remaining holders of the stack stay locked to each other and they need not be manipulated, moved or gripped in any way.

In some embodiments, the release device is part of and/or operated by an automated liquid handling device.

For example, the release device may be a part of a dispensing head of an automated liquid handling device.

In another example, the release device comprises a cylinder of a liquid handling device, and a lower edge of a tip removal sleeve of the liquid handling device faces the matrix plate upon the releasing action.

Exemplary embodiments are described in the following with reference to the accompanying drawings.

FIG. 1 illustrates two pipette tip racks 11, 12 and a locking device 13 configured to be attached under the rack 11, in accordance with a first embodiment of the present invention.

Each of the racks 11, 12 comprises two pairs of opposing lateral sidewalls, wherein each sidewall comprises an outer surface, an inner surface, an upper edge and a lower edge, and two lateral edges. The sidewalls are joined to each other via their lateral edges. A plate comprising a matrix of openings for receiving and holding tips is either integrally connected to the upper edges of the sidewalls or can be placed to rest on the holder.

The locking device comprises two pairs of tongues 15 and a connecting grid 18 extending from one tongue pair to the other.

Figure 2:
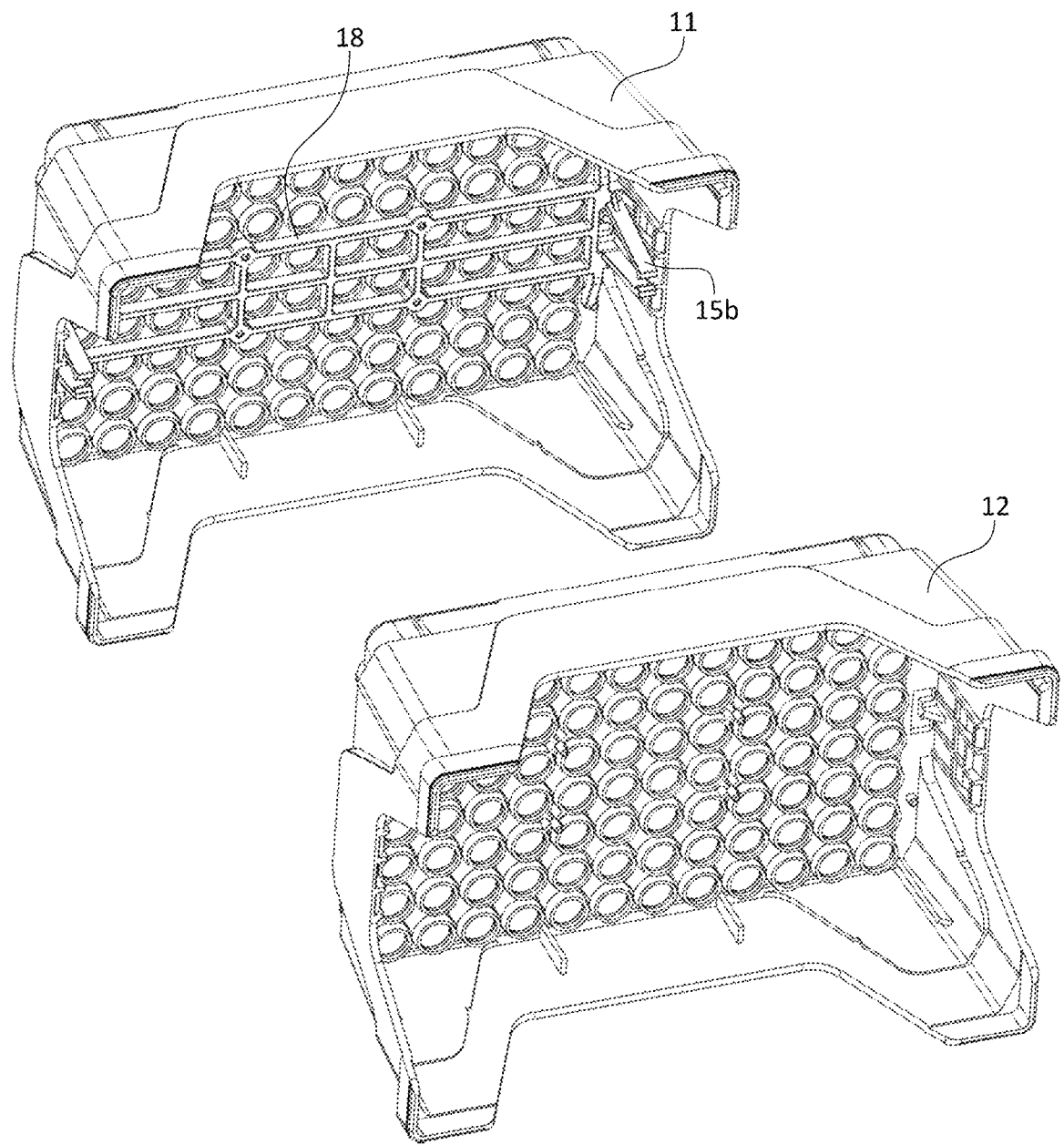
FIG. 2 illustrates the racks of FIG. 1, with the locking device attached under the upper rack.

FIG. 2 illustrates the racks of FIG. 1, with the locking device attached under the upper rack. The locking device is fitted and secured under the tip matrix of the rack so that the connecting grid is parallel with the tip matrix and the tongues point substantially downwards. The locking device, which includes the tongues, and a grid or a bar connecting them to each other, can be attached to and detached from a tip rack freely. For example, during manufacturing of a tip rack, the locking device comprising the tongues can be manufactured separately from the rest of the rack and then later secured to the rack.

Figure 3:
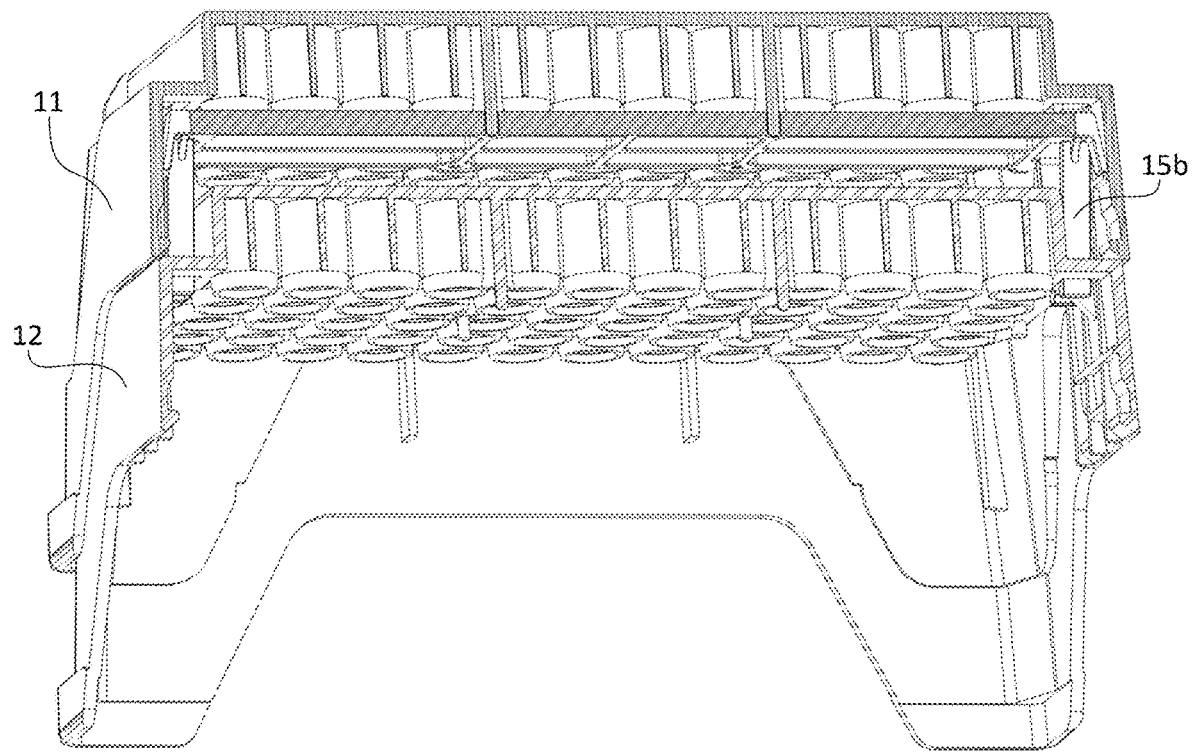
FIG. 3 illustrates as a cross-sectional view the racks of FIG. 2, locked to each other by means of the locking device and forming a stack of racks.

FIG. 3 illustrates as a cross-sectional view the racks of FIG. 2, locked to each other by means of the locking device and forming a stack of racks.

The change from a locked configuration to an unlocked configuration is carried out via a mechanical action of a release device that bends the tongues in each pair of tongues 15a, 15b apart from each other. FIGS. 4A to 4C and 5A to 5B illustrate how the racks can be released from each other by means of a release device 19.

Figure 4A:
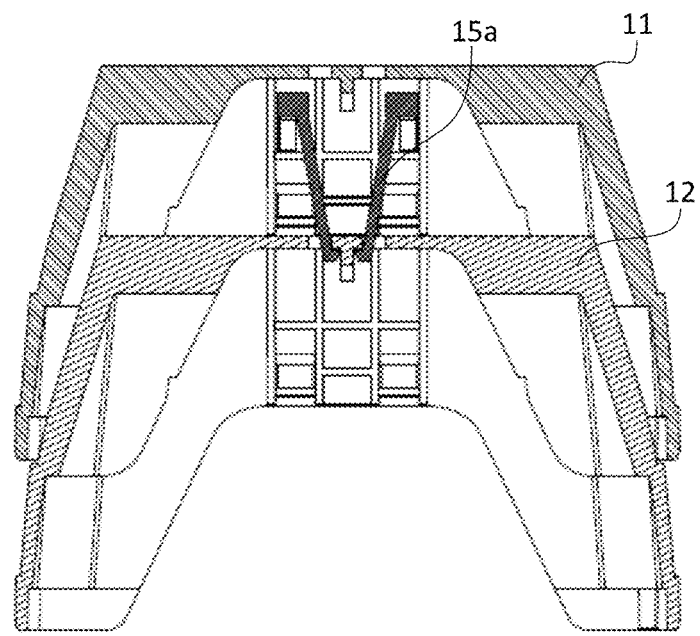
FIG. 4A illustrates the locked stack of FIG. 3.

FIG. 4A illustrates the locked stack of FIG. 3.

The tongues 15a, 15b are positioned so that they become inserted into the release openings at corresponding positions in the immediately below lying rack. Upon passing the tongues into the release openings, one pair of tongues into one release opening, the distal ends of the tongues bend away from each other in order to fit into the release openings. When the tongues have been inserted into the release openings, they return to their initial rest configuration, and the racks are then in a locked configuration, which is shown in FIG. 4A.

Figure 4B:
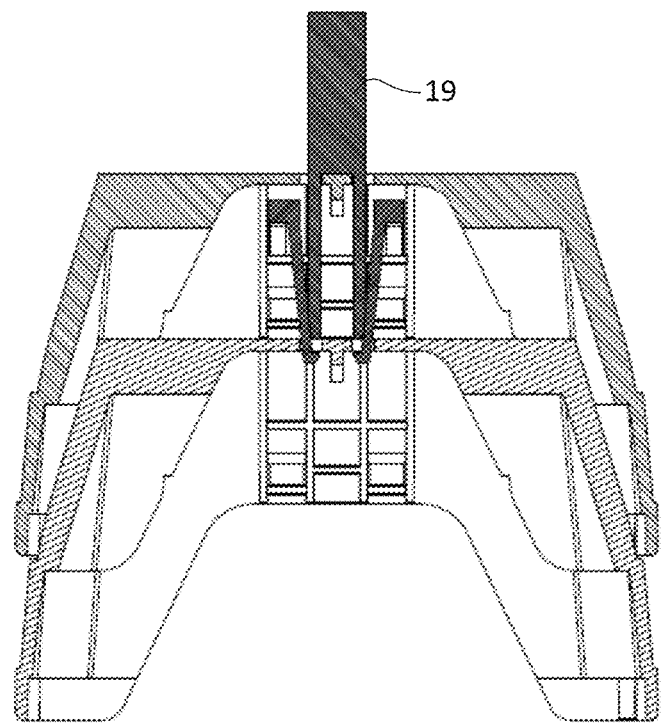
FIG. 4B illustrates the unlocking of the stack of FIG. 3 by means of a release device.

FIG. 4B illustrates the unlocking of the stack of FIG. 3 by means of a release device 19.

Figure 4C:
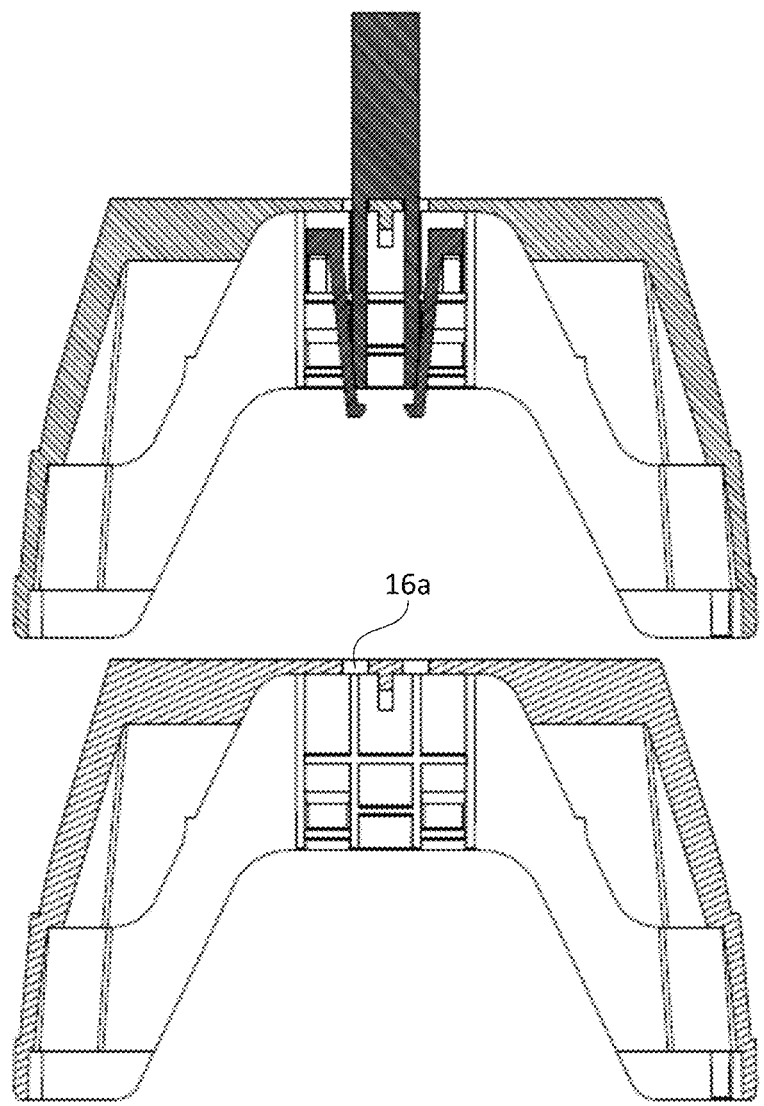
FIG. 4C illustrates the unlocked racks, with the release device still attached to the upper rack.

FIG. 4C illustrates the unlocked racks 11 and 12, with the release device 19 still attached to the upper rack.

In FIG. 4B the ends of the release device 19 have been inserted into the release openings of the upper rack 11. In this cross-sectional side view only one of the release openings and only one end of the release device is visible. The end (in the form of a fork) bends the tongues 15a apart from each other so that the locking is released. Now the upper rack 11 can be lifted from the stack, as shown in FIG. 4C, for example by means of an automated manipulator or manually as well. During lifting, the forks in the two ends of the release device remain inside the release openings in the upper rack 11 and between the tongues 15a, 15b with the help of friction and keeps the tongues in a bent configuration.

Figure 5A:
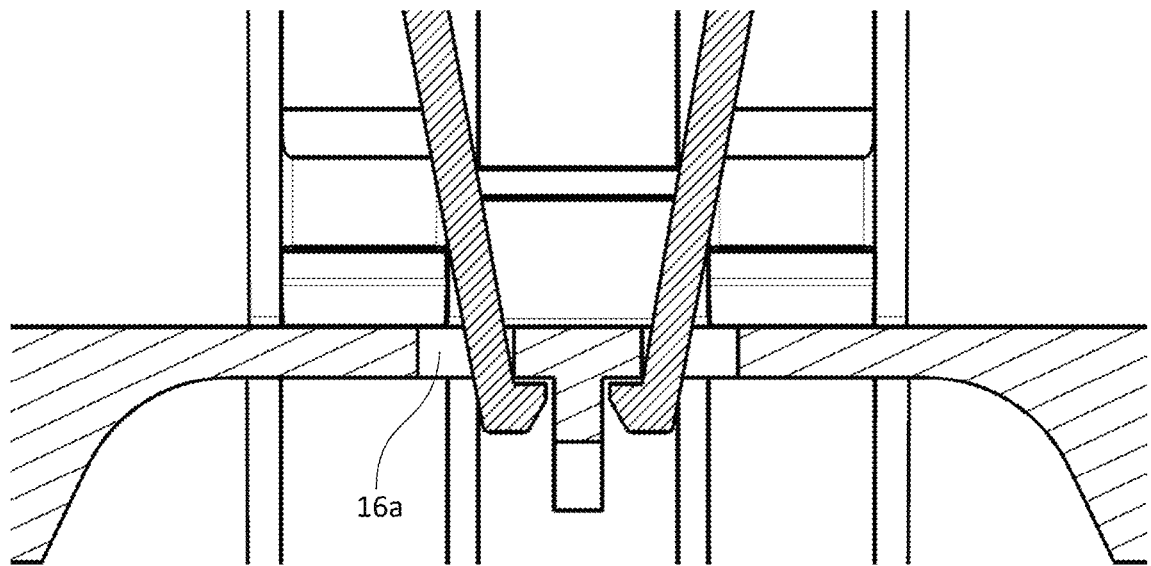
FIG. 5A shows a magnified view of FIG. 4A.

FIG. 5A shows a magnified view of FIG. 4A.

Figure 5B:
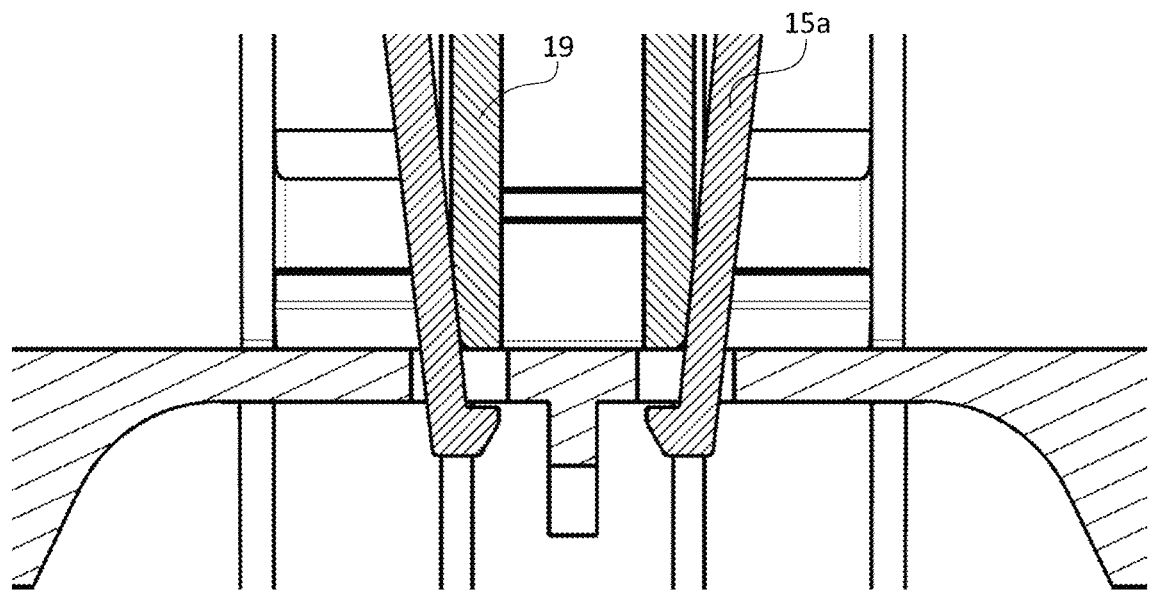
FIG. 5B shows a magnified view of FIG. 4B.

FIG. 5B shows a magnified view of FIG. 4B.

Figure 6:
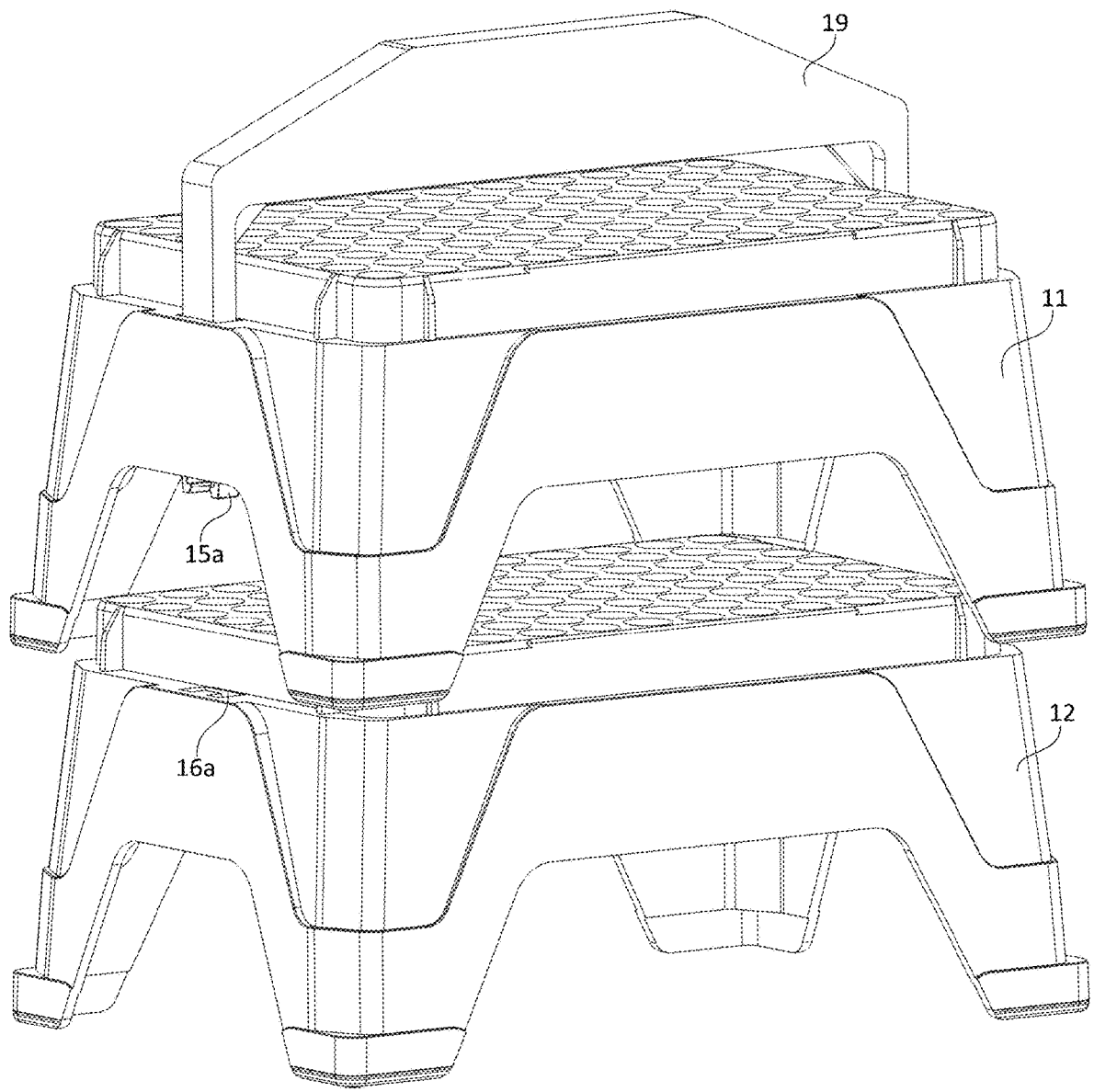
FIG. 6 shows a three-dimensional view of the unlocked stacks of FIG. 4C.

FIG. 6 shows a three-dimensional view of the unlocked stack of FIG. 4C. In FIG. 6, the release device 19 is in the form of a U-shaped handle that comprises a fork in its each end. The forks have been inserted from above the stack into the release openings of the topmost rack: one fork is inserted into one release opening. Each fork has been inserted between a pair of tongues to bend the tongues apart from each other and to thereby release the locking between the racks.

Figure 17A:
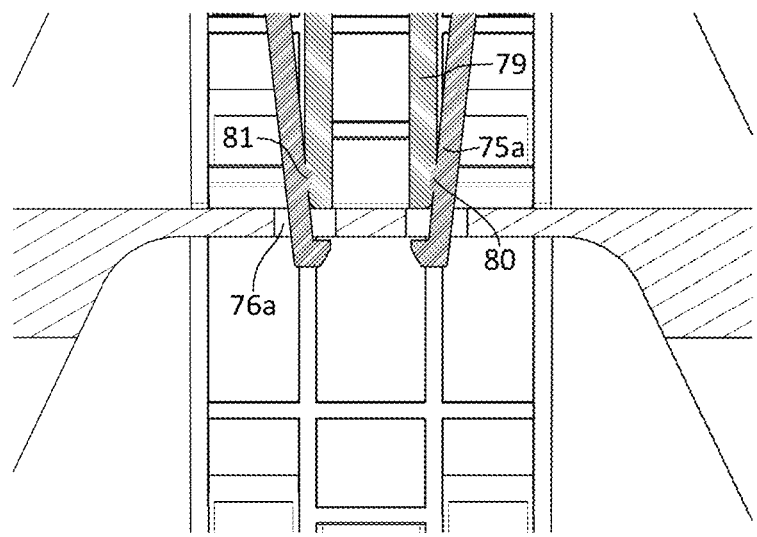
FIGS. 17A and 17B illustrate a modified version of the first embodiment shown in FIGS. 1 to 6.
Figure 17B:
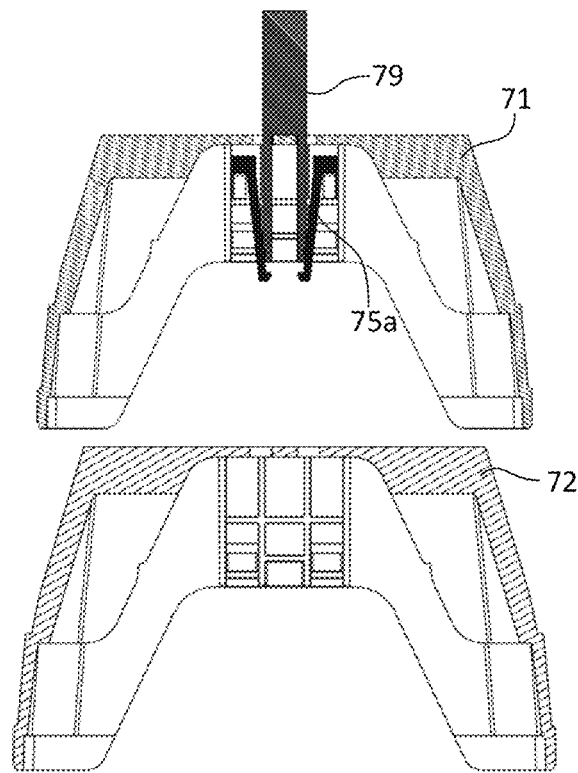

FIGS. 17A and 17B illustrate a modified version of the first embodiment shown in FIGS. 1 to 6. The ends of the release device 79 are inserted into the release openings (76a shown) of the upper rack 71, as shown in FIG. 17A. The end, in the form of a fork, bends the tongues 75a apart from each other so that the locking is released. Then the upper rack 71 can be lifted from the stack. In this version, the release device 79 is configured to remain engaged with the upper rack 71 after the locking between the racks 71 and 72 has been released. Such engagement is enabled by the protrusions 80, 81 in the tongues 75a. The release device comprises complementary indentations. Upon insertion of the release device, the protrusions become inserted into the indentations, as shown in FIG. 17A. The upper rack 71 can then be lifted and carried together with the release device 79 as shown in FIG. 17B.

Preferably the release device 79 is a part of an automated gripper or manipulator.

Figure 7:
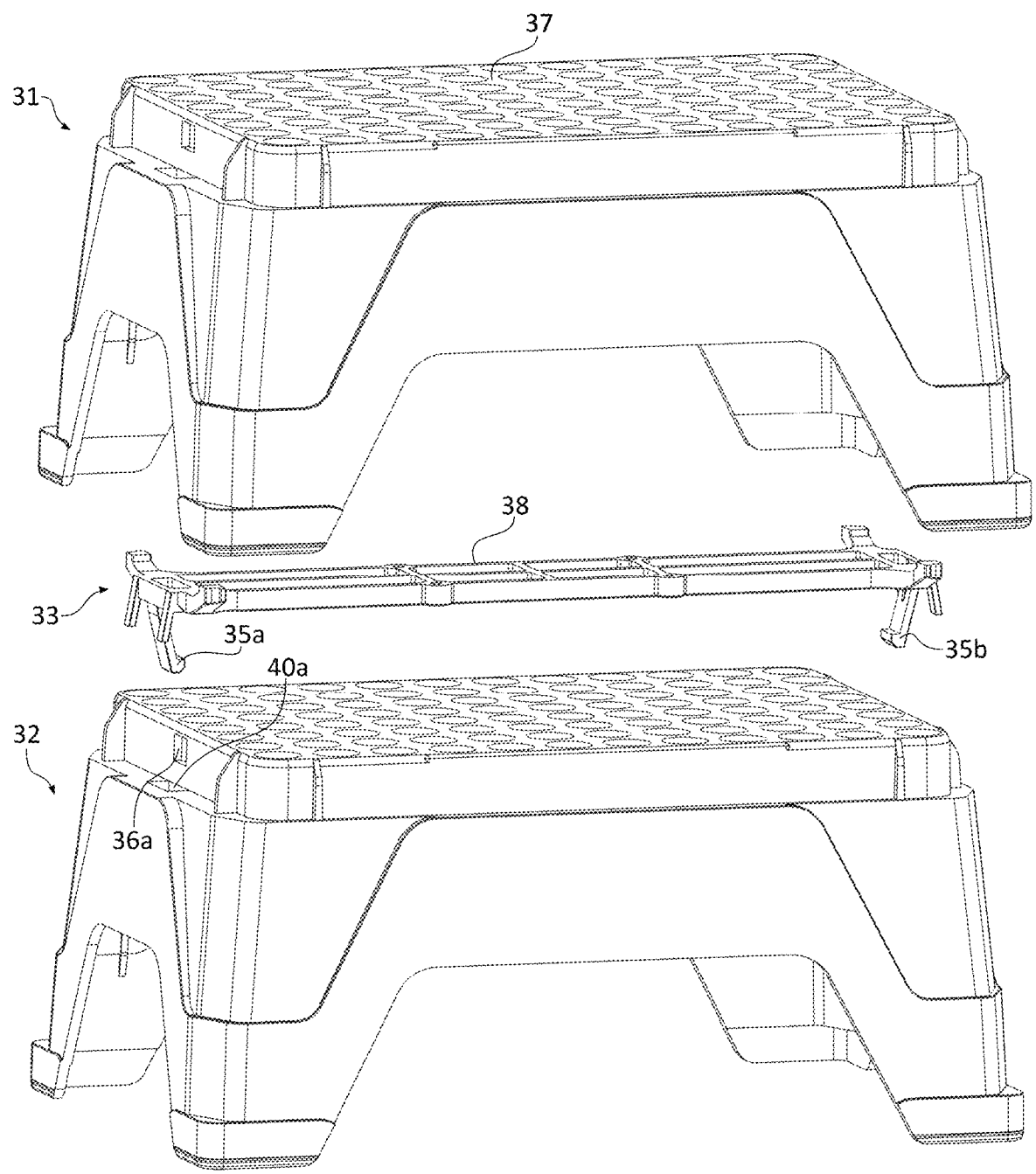
FIG. 7 illustrates two pipette tip racks and a locking device configured to be attached under the rack, in accordance with a second embodiment of the present invention.

FIG. 7 illustrates two pipette tip racks 31, 32 and a locking device 33 configured to be attached under the rack, in accordance with a second embodiment of the present invention. The locking device comprises two bendable tongues 35a, 35b in the opposite ends of a connecting bar 38. The bendable tongues are configured to be inserted into openings (locking openings) in rack surfaces that are perpendicular to the matrix plate. For example, the bendable tongue 35a is configured to be inserted into the opening 36a. Each rack comprises two such openings and they are located on opposite sides of the rack.

In this embodiment the release openings are located in surfaces that are parallel to the matrix plate. Each rack comprises two release openings (such as 40a) and they are also located on said opposite sides of the rack.

Figure 8:
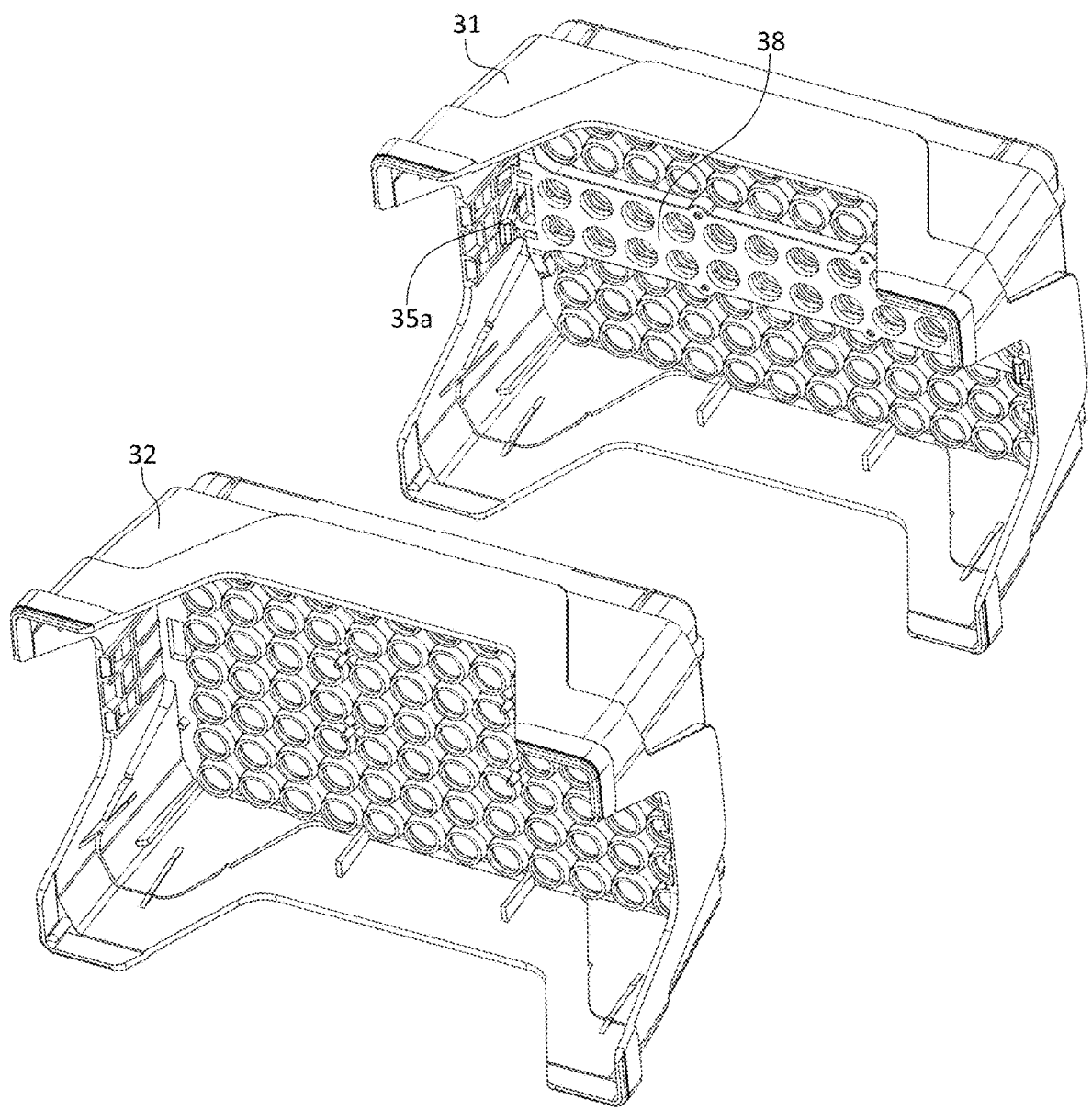
FIG. 8 illustrates the racks of FIG. 7, with the locking device attached under the upper rack.

FIG. 8 illustrates the racks of FIG. 7, with the locking device 33 attached under the upper rack 31.

Figure 9:
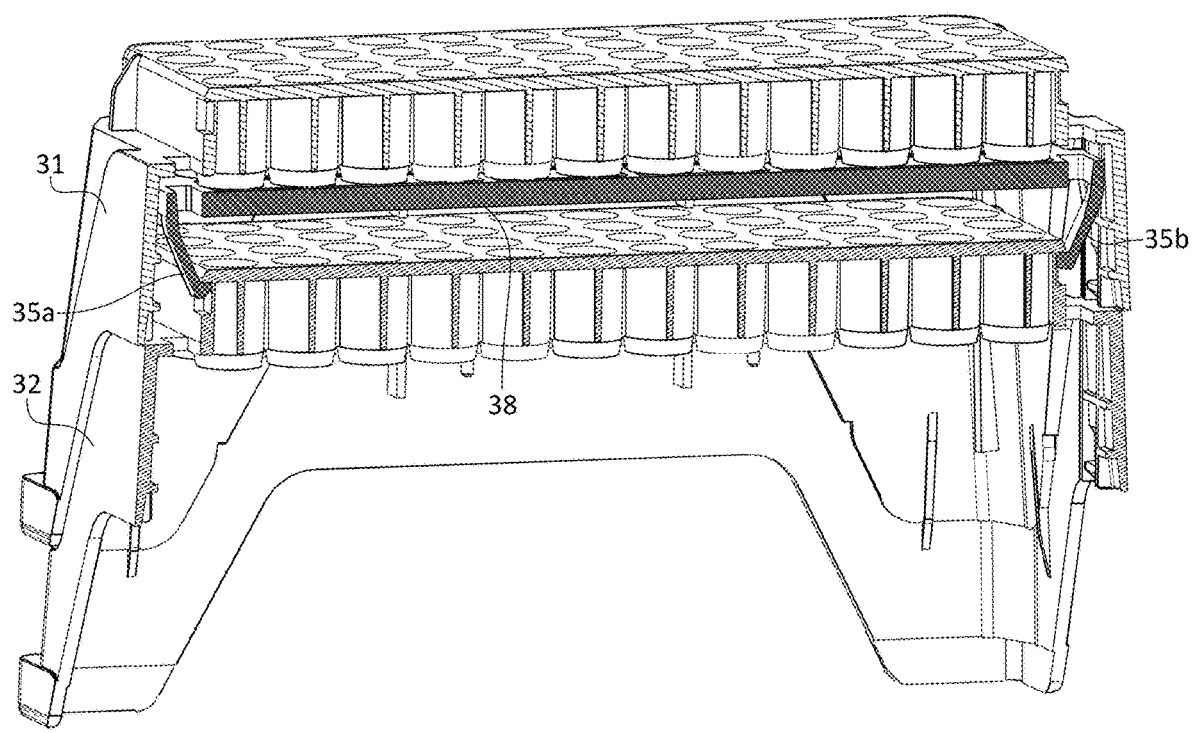
FIG. 9 illustrates as a cross-sectional view the racks of FIG. 8, locked to each other by means of the locking device and forming a stack of racks.

FIG. 9 illustrates as a cross-sectional view the racks of FIG. 8, locked to each other by means of the locking device and forming a stack of racks. The tongues 35a, 35b have been inserted into the respective locking openings (36a shown in FIG. 7).

Figure 10A:
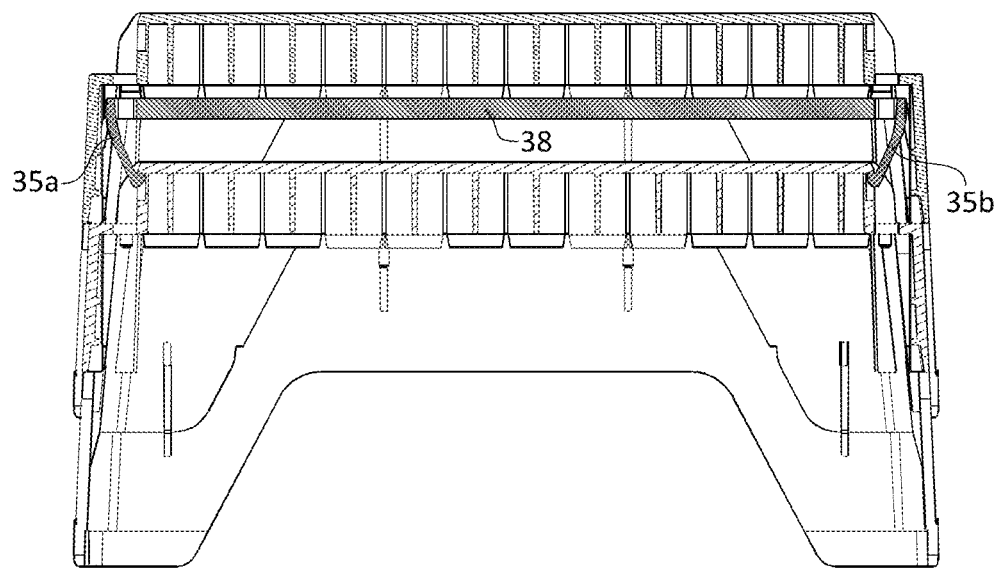
FIG. 10A illustrates the locked stack of FIG. 9.

FIG. 10A illustrates the locked stack of FIG. 9. The distal ends of the tongues 35a, 35b engage with the lower surface of the matrix plate of the lower rack 32.

Figure 10B:
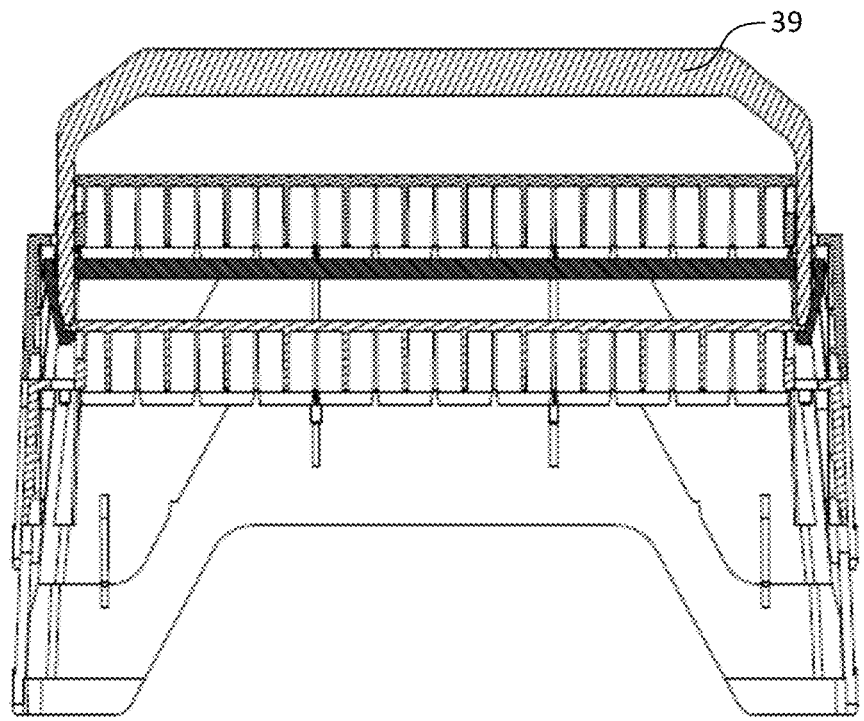
FIG. 10B illustrates the unlocking of the stack of FIG. 10A by means of a release device.

FIG. 10B illustrates the unlocking of the stack of FIG. 10A by means of a release device 39, which is in the form of an U-shaped handle. Then ends of the handle are inserted into respective release openings (40a shown in FIG. 7) in order to bend the tongues and to release the locking.

Figure 10C:
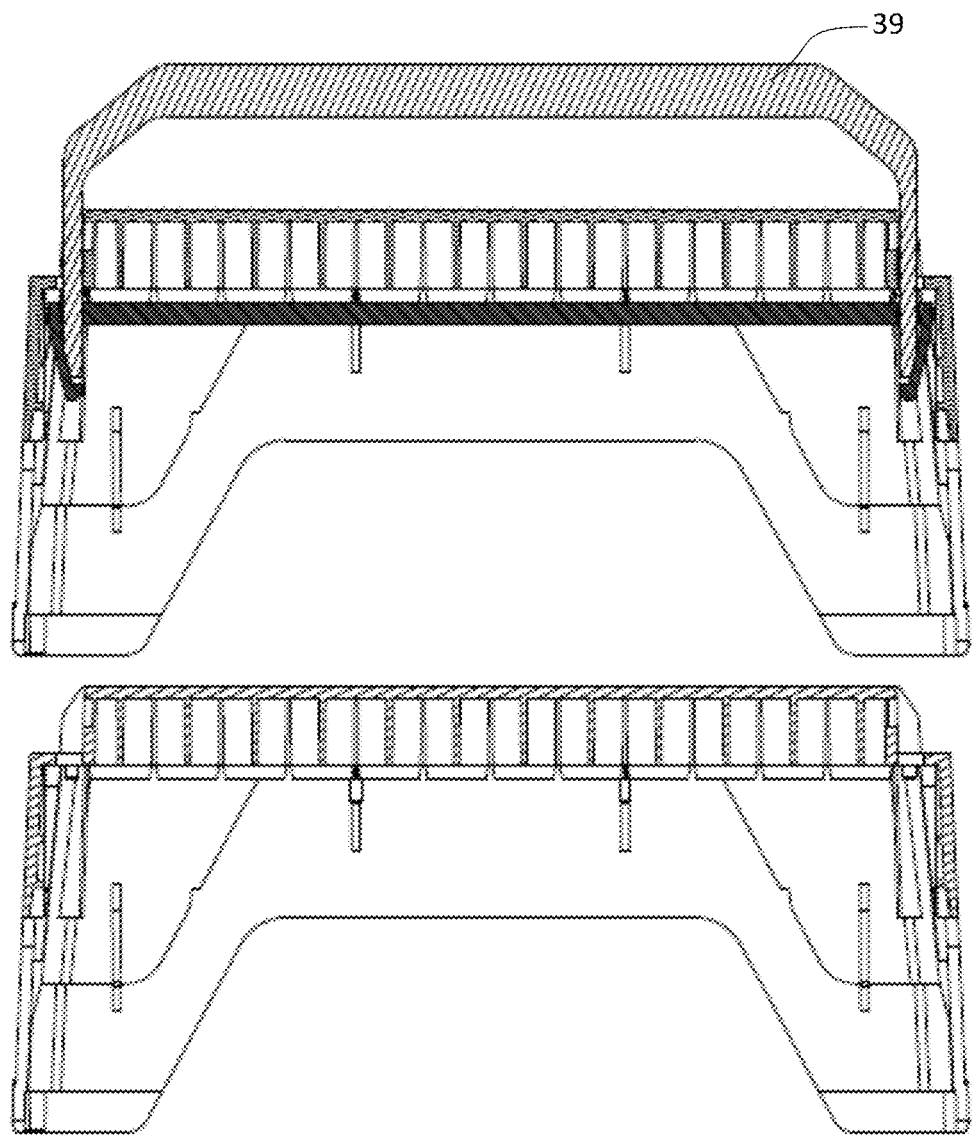
FIG. 10C illustrates the unlocked racks, with the release device still attached to the upper rack.

FIG. 10C illustrates the unlocked racks, with the release device 39 still attached to the upper rack 31.

Figure 11A:
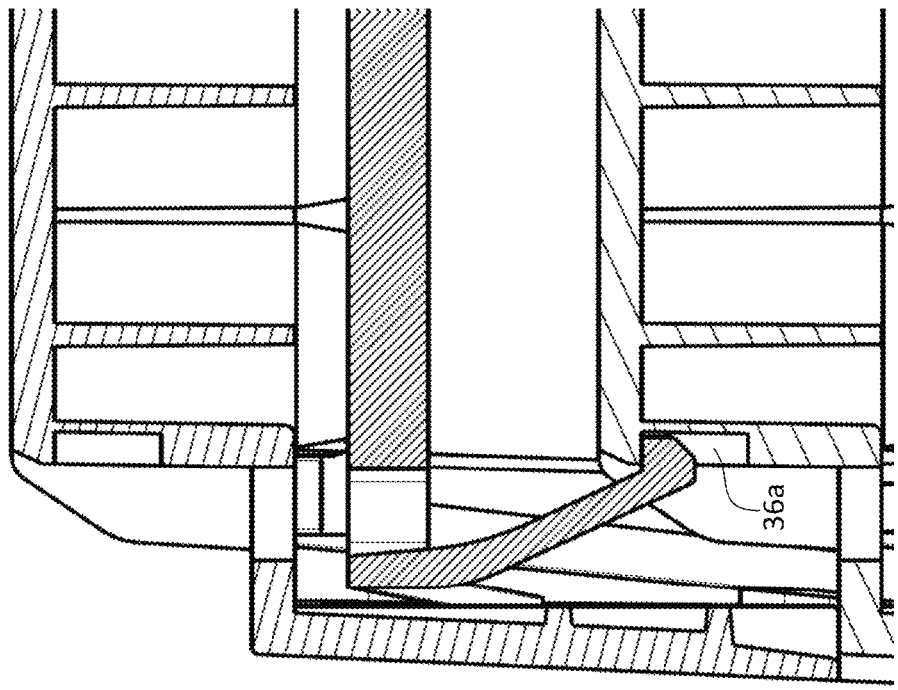
FIG. 11A shows a magnified view of FIG. 10A.

FIG. 11A shows a magnified view of FIG. 10A.

Figure 11B:
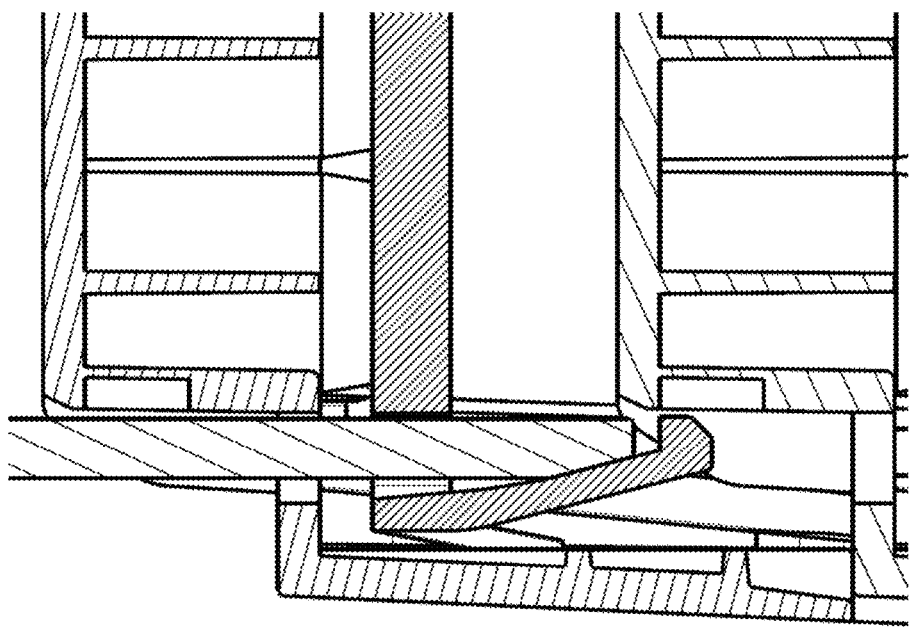
FIG. 11B shows a magnified view of FIG. 10B.

FIG. 11B shows a magnified view of FIG. 10B.

Figure 12:
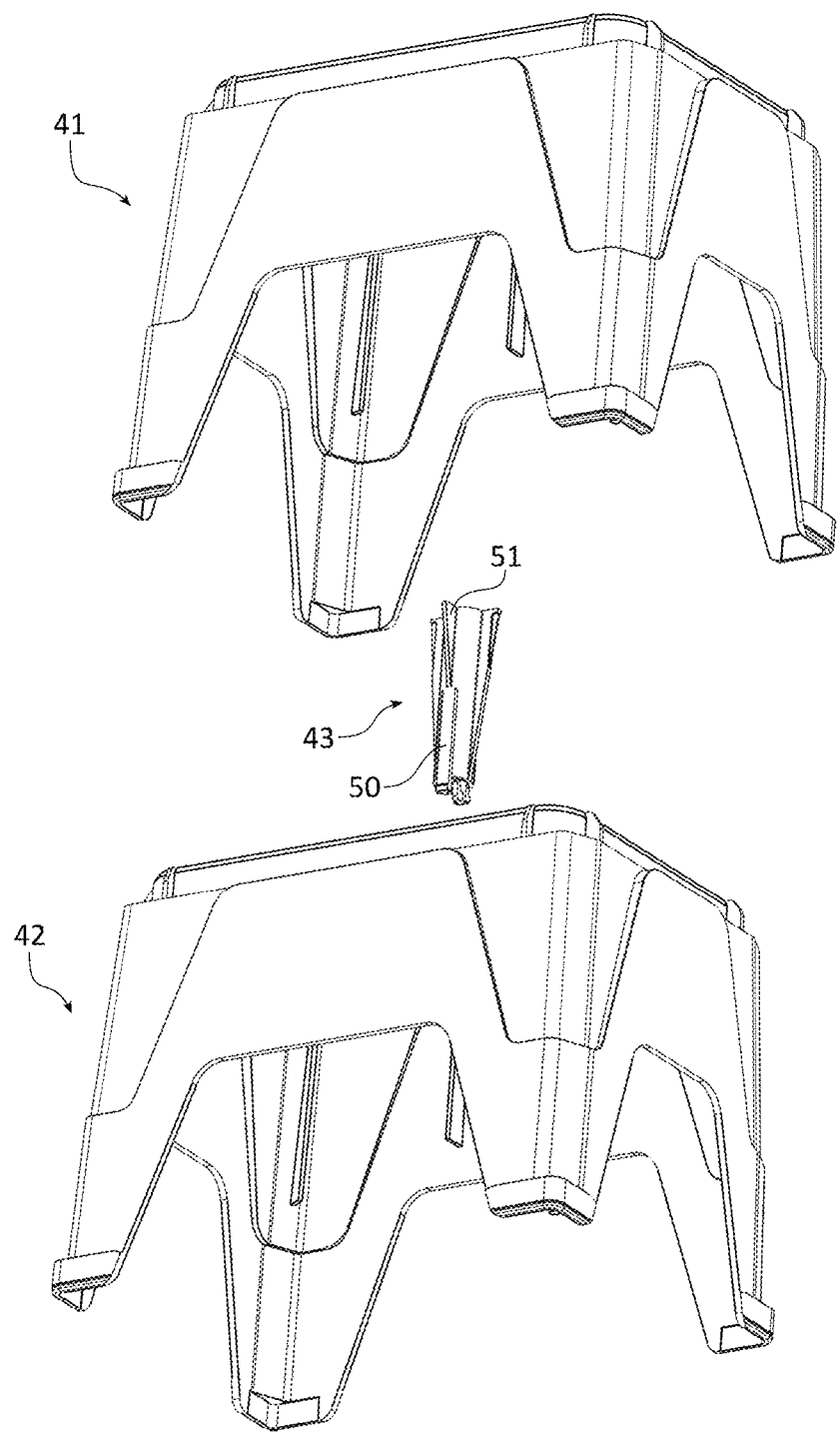
FIG. 12 illustrates two pipette tip racks and a locking device configured to be attached under the rack, in accordance with a third embodiment of the present invention.

FIG. 12 illustrates two pipette tip racks 41, 42 and a locking device 43 configured to be attached under the rack 41, in accordance with a third embodiment of the present invention. The locking device is in the form of a hollow pin with radially bendable portions 50 in its lateral surface. The hollow pin has an overall shape of a truncated cone.

Figure 13:
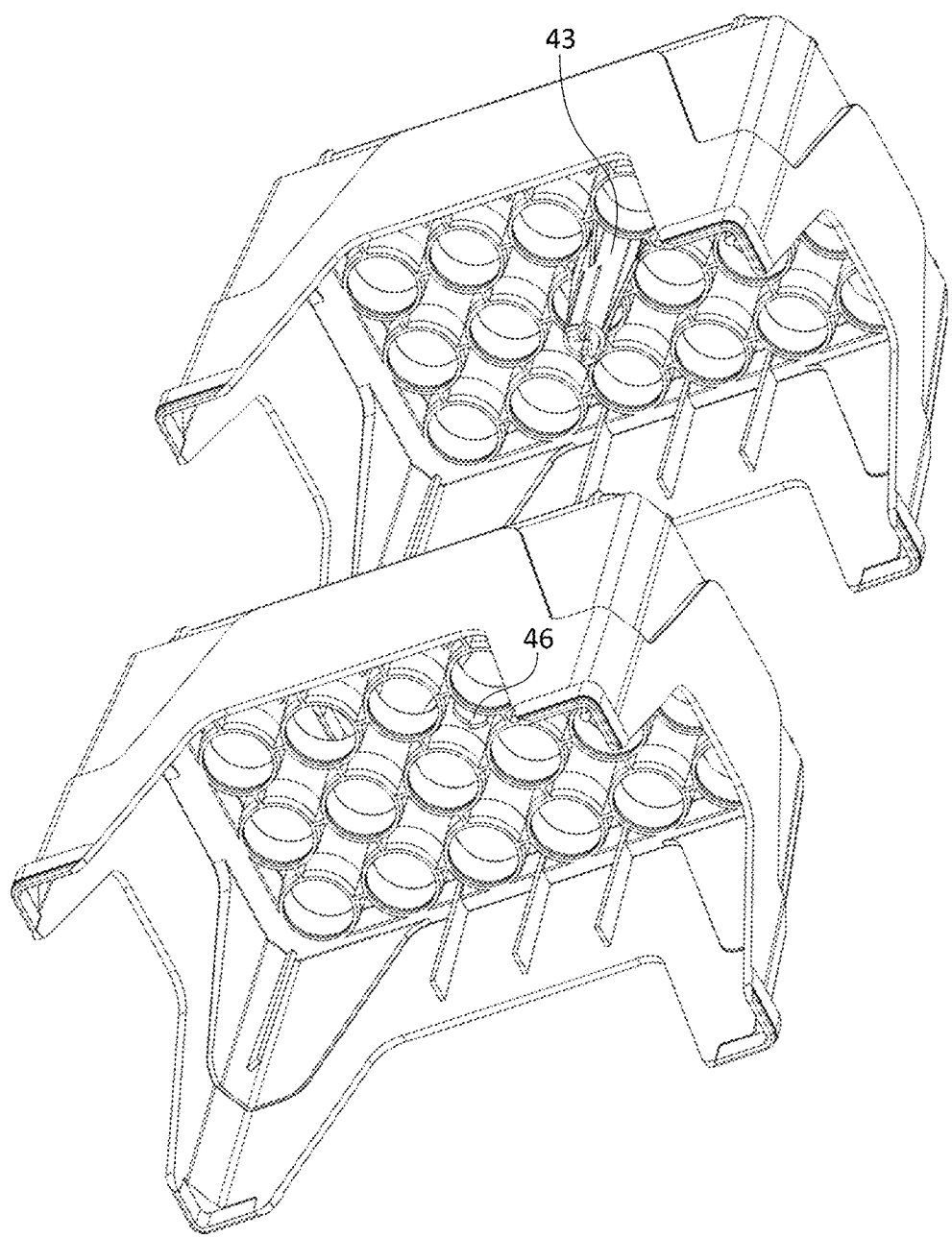
FIG. 13 illustrates the racks of FIG. 12, with the locking device attached under the upper rack.

FIG. 13 illustrates the racks of FIG. 12, with the locking device attached under the upper rack 41. The locking device is configured to be inserted into the opening 46 in the lower rack 42. The opening 46 functions both as a locking opening and as a release opening.

Figure 14:
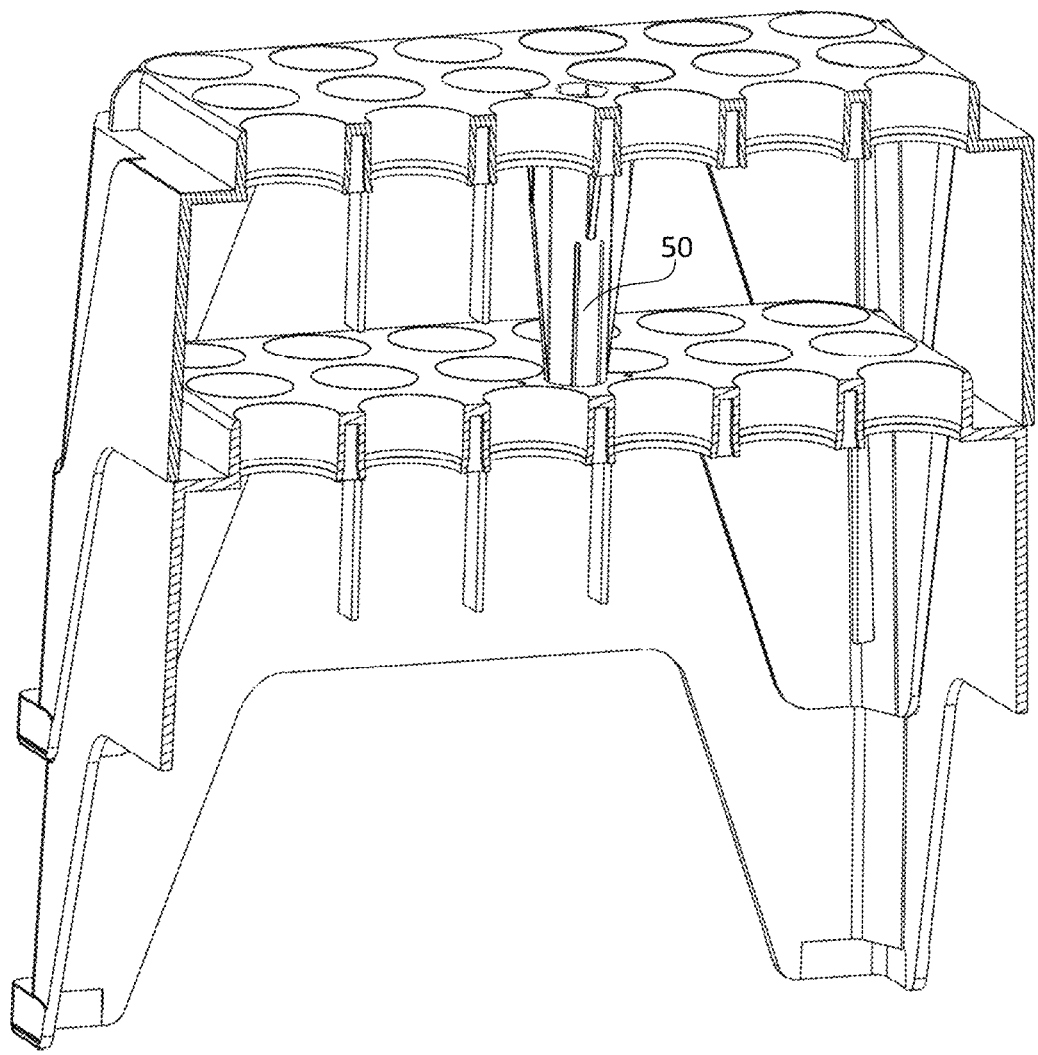
FIG. 14 illustrates as a cross-sectional view the racks of FIG. 13, locked to each other by means of the locking device and forming a stack of racks.

FIG. 14 illustrates as a cross-sectional view the racks of FIG. 13, locked to each other by means of the locking device and forming a stack of racks. The distal end of the locking device has been inserted into the opening 46.

Figure 15A:
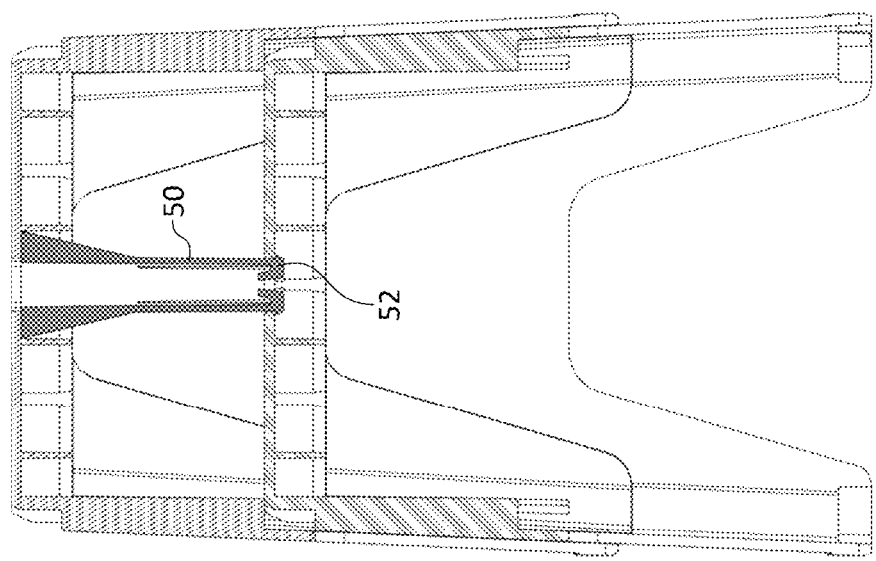
FIG. 15A illustrates the locked stack of FIG. 14.

FIG. 15A illustrates the locked stack of FIG. 14. Here the functioning and shape of the locking device can be seen more clearly. The distal end of the locking device is in a wider configuration in the locked position and engages with the lower rack 42.

Figure 15B:
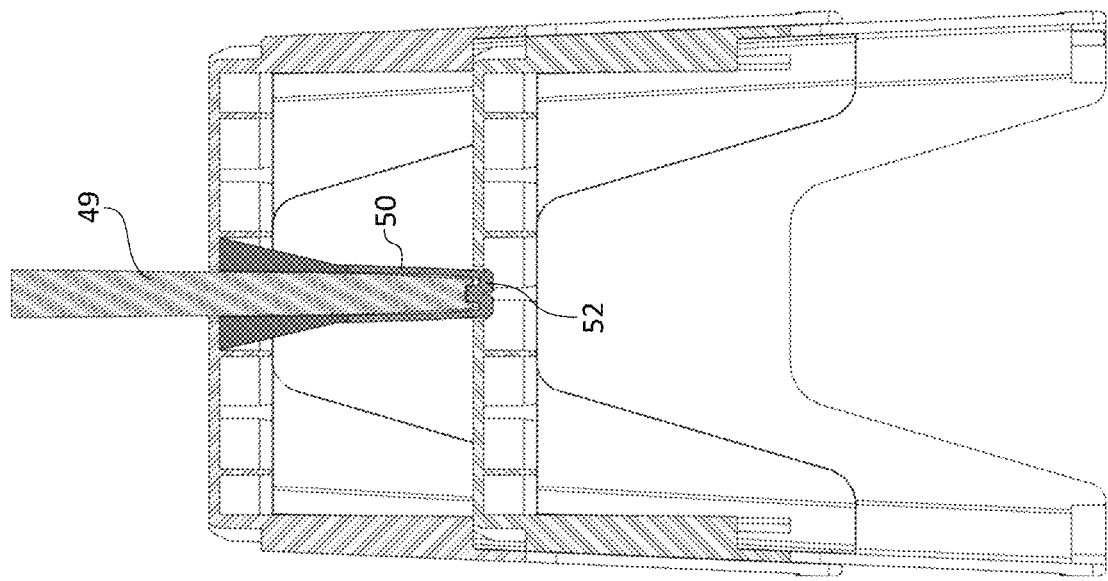
FIG. 15B illustrates the unlocking of the stack of FIG. 15A by means of a release device.

FIG. 15B illustrates the unlocking of the stack of FIG. 15A by means of a release device. As the release device 49 is inserted into the hollow locking device and simultaneously into the opening 46, the distal end of the locking device becomes narrower as the release device bends the bendable portions. Then the locking becomes released and the upper rack 41 can be removed.

Figure 15C:
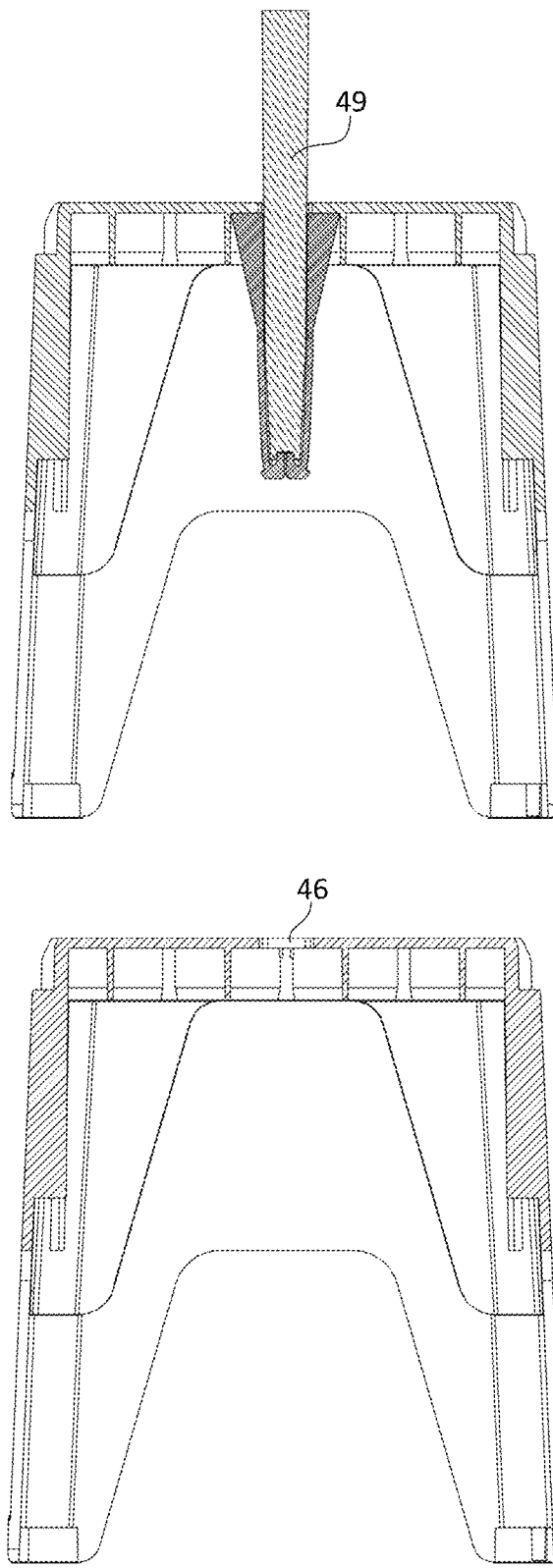
FIG. 15C illustrates the unlocked racks, with the release device still attached to the upper rack.

FIG. 15C illustrates the unlocked racks, with the release device 49 still attached to the upper rack and located inside the hollow locking device.

Figure 16A:
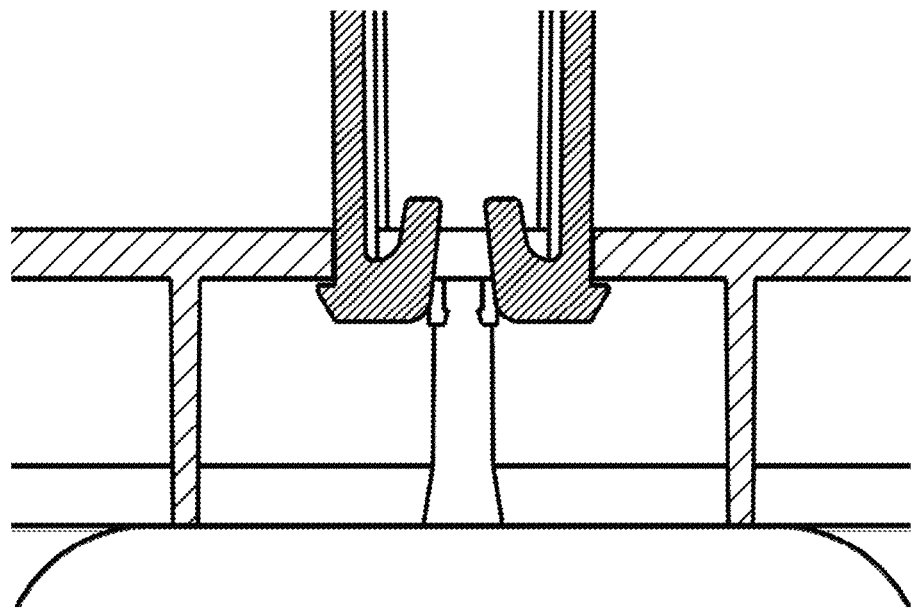
FIG. 16A shows a magnified view of FIG. 15A.

FIG. 16A shows a magnified view of FIG. 15A.

Figure 16B:
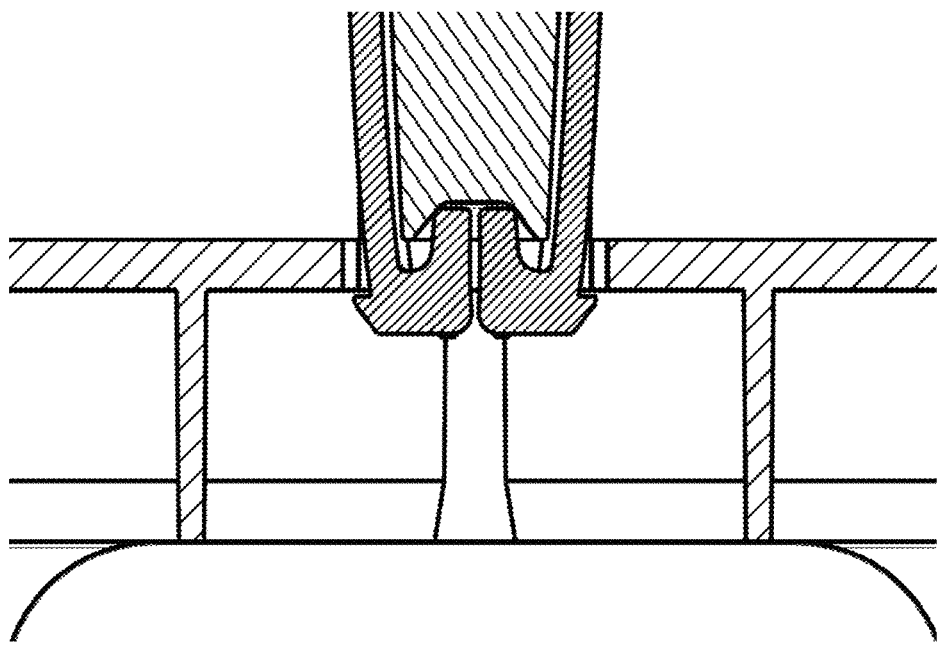
FIG. 16B shows a magnified view of FIG. 15B.

FIG. 16B shows a magnified view of FIG. 15B.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in handling of pipette tip racks in a stack form.

CITATION LIST

Patent Literature

US 2006045815 A1

The invention claimed is:

1. A holder for laboratory consumables, the holder comprising:
    two pairs of opposing lateral sidewalls;
    each sidewall comprises an outer surface, an inner surface, an upper edge and a lower edge, and two lateral edges;
    the sidewalls are joined to each other via their lateral edges;
    a plate comprising a matrix of openings, connected to the upper edges of the sidewalls;
    a surface arranged lower than the plate;
    at least one release opening located in said surface; and
    means for locking the holder on top of another holder to form a stack of holders;
    wherein the locking is configured to be released by inserting a release device into the at least one release opening so that a vertically-directed input force is applied to said means for locking from above the stack of holders.

2. The holder according to claim 1, wherein:
    said surface is parallel with said plate comprising a matrix of openings.

3. The holder according to claim 1, wherein the means for locking comprises at least one flexible or deformable tongue.

4. The holder according to claim 1, wherein the means for locking comprises a radially deformable hollow pin.

5. The holder according to claim 1, wherein the means for locking is detachable from and re-attachable to the holder.

6. A set of parts comprising at least a first holder and a second holder for disposable pipette tips according to claim 1.

7. The set of parts according to claim 6, wherein the holders are locked to each other, the first holder on top of the second holder, and form a stack.

8. The set of parts according to claim 6, wherein each holder comprises the at least one release opening into which a release device can be inserted from above the stack of holders in order to release the locking, the set of parts further comprising a release device configured to be inserted into the at least one release opening or openings of the topmost holder of the stack from above the stack of holders in order to release the locking between the topmost holder and the holder lying immediately below it.

9. The set of parts according to claim 8, wherein the release device is in the form of a pin, a bar or a handle, and an end of said release device is configured to be inserted into the at least one release opening of the topmost holder.

10. The holder according to claim 1, wherein the locking is configured so that the release device bends at least two tongues of the means for locking to release the locking.

11. A method of manipulating holders of laboratory consumables, the method comprising:
    providing a locked stack of holders; wherein a holder comprises at least one release opening;
    releasing the locking between the uppermost holder and the holder lying immediately below it by inserting a release device into the at least one release opening so that a vertically-directed input force is applied to a means for locking in the uppermost holder from above the stack of holders; and
    removing the uppermost holder from the stack of holders.

12. The method according to claim 11, wherein said vertically-directed input force is applied by a user or by an automated device.

13. The method according to claim 11, wherein said providing step comprises providing a locked stack of holders to a platform of an automated device, wherein said force is applied by the automated device, and wherein each holder in the locked stack of holders comprises:
- two pairs of opposing lateral sidewalls;
- each sidewall comprises an outer surface, an inner surface, an upper edge and a lower edge, and two lateral edges;
- the sidewalls are joined to each other via their lateral edges;
- a plate comprising a matrix of openings, connected to the upper edges of the sidewalls; and
- means for locking it on top of another holder to form a stack of holders.

14. The method according to claim 13, wherein the uppermost holder becomes connected to the release device upon said releasing of the locking, and said removing comprises lifting the uppermost holder from the stack together with and as connected to the release device.

15. A means for locking a first holder of laboratory consumables on top of a second holder of laboratory consumables to form a locked stack of holders, wherein each holder comprises:
- two pairs of opposing lateral sidewalls;
- each sidewall comprises an outer surface, an inner surface, an upper edge and a lower edge, and two lateral edges;
- the sidewalls are joined to each other via their lateral edges; and
- a plate comprising a matrix of openings, connected to the upper edges of the sidewalls;
- at least one release opening;

wherein
- the means for locking is attachable under the first holder, and when attached, said means is encased by the lateral sidewalls and the matrix plate of the first holder;
- the means for locking comprises a bendable or deformable part that is configured to engage with the second holder in the locked position of the holders; and
- the locking is configured to be released by inserting a release device into the at least one release opening so that a vertically-directed input force is applied to said bendable or deformable part from above the stack of holders.

16. A holder for laboratory consumables, the holder comprising:
- two pairs of opposing lateral sidewalls;
- each sidewall comprises an outer surface, an inner surface, an upper edge and a lower edge, and two lateral edges;
- the sidewalls are joined to each other via their lateral edges;
- a plate comprising a matrix of openings, connected to the upper edges of the sidewalls; and
- means for locking the holder on top of another holder to form a stack of holders;

wherein the locking is configured to be released by applying a force to said means for locking from above the stack of holders, wherein the means for locking comprises a radially deformable hollow pin.

* * * * *